(12) United States Patent
Colvig et al.

(10) Patent No.: US 7,941,242 B2
(45) Date of Patent: May 10, 2011

(54) APPARATUS AND METHOD TO PROVIDE REDUNDANT ACCESSOR AVAILABILITY

(75) Inventors: Arthur J. Colvig, Tucson, AZ (US); Brian G. Goodman, Tucson, AZ (US); Ronald F. Hill, Jr., Tucson, AZ (US); Timothy K. Pierce, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 2273 days.

(21) Appl. No.: 10/674,298

(22) Filed: Sep. 29, 2003

(65) Prior Publication Data

US 2005/0080964 A1  Apr. 14, 2005

(51) Int. Cl.
*G06F 7/00* (2006.01)
(52) U.S. Cl. ........................................................ 700/213
(58) Field of Classification Search .............. 700/7, 213, 700/214, 218, 228
See application file for complete search history.

(56) References Cited

U.S. PATENT DOCUMENTS

| | | | |
|---|---|---|---|
| 5,513,156 A | 4/1996 | Hanaoka et al. | 369/34 |
| 5,640,510 A | 6/1997 | Hanaoka et al. | 395/183.18 |
| 5,768,141 A | 6/1998 | Hanaoka et al. | 364/478.02 |
| 5,894,461 A | 4/1999 | Fosler et al. | 369/34 |
| 5,914,919 A | 6/1999 | Fosler et al. | 369/34 |
| 5,956,301 A * | 9/1999 | Dimitri et al. | 369/30.31 |
| 6,014,675 A | 1/2000 | Brewer et al. | 707/204 |
| 6,052,341 A | 4/2000 | Bingham et al. | 369/34 |
| 6,061,309 A | 5/2000 | Gallo et al. | 369/34 |
| 6,161,058 A | 12/2000 | Nishijo et al. | 700/218 |
| 6,304,524 B1 * | 10/2001 | Gallo et al. | 369/30.28 |
| 6,309,162 B1 * | 10/2001 | White | 414/273 |
| 6,438,459 B1 * | 8/2002 | Dimitri et al. | 700/255 |
| 6,493,604 B1 * | 12/2002 | Kappel et al. | 700/213 |
| 6,591,164 B1 * | 7/2003 | Plutt et al. | 700/245 |
| 6,609,046 B2 * | 8/2003 | Ostwald et al. | 700/214 |
| 6,658,320 B2 * | 12/2003 | Goodman et al. | 700/214 |
| 6,675,063 B2 * | 1/2004 | Bosley et al. | 700/218 |
| 6,799,084 B2 * | 9/2004 | Grobler | 700/235 |
| 2002/0062167 A1 * | 5/2002 | Dimitri et al. | 700/214 |

* cited by examiner

*Primary Examiner* — Gene Crawford
*Assistant Examiner* — Ramya Prakasam
(74) *Attorney, Agent, or Firm* — Dale F. Regelman; Quarles & Brady LLP

(57) ABSTRACT

A method to provide redundant accessor availabilty in an automated data storage library. The method provides a data storage and retrieval system comprising one or more data storage devices a robot accessor and a gripper. Either at the same time or at a later time, the user obtains a second gripper and/or a second accessor. The method allows selection and/or authorization for additional support from the second gripper and/or the second accessor upon request and authorization. The redundant accessor capabilities are provided on an honor system for payment for the additional capability, and/or uses a system for tracking the redundant accessor usage, and/or uses license keys or other controls that must be obtained prior to enabling redundant accessor capabilities.

36 Claims, 5 Drawing Sheets

APPARATUS AND METHOD TO PROVIDE REDUNDANT ACCESSOR AVAILABILITY

FIELD OF THE INVENTION

The present invention relates to a data storage system for dynamic information storage or retrieval. More particularly, the invention concerns a method to provide redundant accessor availability in an information storage and retrieval system.

BACKGROUND OF THE INVENTION

Automated data storage libraries provide a means for storing large quantities of data in data storage media that are not permanently mounted in data storage drives, and that are stored in a readily available form on storage shelves. One or more accessors retrieve selected data storage media from storage shelves and provide them to data storage drives.

Typically, data stored on data storage media of an automated data storage library, once requested, is needed quickly. In addition, as customer expectations move toward a concept of continuous availability, such as the well known "24×7× 365" availability, it is increasingly important that equipment malfunction does not disrupt customer operations.

Traditionally, redundancy has been used to mitigate the effects of equipment malfunction. In the event a device, such as an accessor, fails, the ability to activate and operate a reserve accessor provides failover protection and therefore, improves the availability of the library.

Resource redundancy, however, could also be used to improve the overall performance of the automated data storage library in the absence of equipment failure. For example, the ability to simultaneously operate two accessors during heavy data access periods, while operating a single accessor at other times, would provide optimal system performance at reduced operating and purchase costs.

What is needed is an apparatus and method that allows a data storage system user to select varying levels of accessor availability on request. Applicants' apparatus and method provide at least one redundant gripper and/or accessor which can be partially, or completely, activated by the user.

SUMMARY OF THE INVENTION

In certain embodiments, Applicants' invention includes an apparatus and a method to provide selectable redundant accessor availability in a data storage and retrieval system. The method provides a data storage and retrieval system comprising one or more data storage devices and an accessor, where the accessor comprises a first gripper and a second gripper. The method initially allows operation of the first gripper but not the second gripper. Authorization to operate the second gripper may be obtained by the system user as those additional capabilities are needed.

In certain embodiments, Applicants' invention includes an apparatus and a method to provide selectable redundant accessor availability in a data storage and retrieval system. The method provides a data storage and retrieval system comprising one or more data storage devices, a first accessor, and a second accessor. The method initially allows operation of the first accessor but not the second accessor. Authorization to operate the second accessor may be obtained by the system user as those additional capabilities are needed.

DETAILED DESCRIPTION OF THE PREFERRED EMBODIMENTS

This invention is described in preferred embodiments in the following description. The preferred embodiments are described with reference to the Figures. The invention will be described as embodied in an automated data storage library used for data processing applications. The following description of Applicants' method to provide redundant accessor availability is not meant, however, to limit Applicant's invention to automated data storage libraries, as the invention herein can be applied to providing redundant availability to robotic systems in general.

Applicants' apparatus and method provides a data storage and retrieval system which includes redundant accessor and/ or gripper resources, including hardware, software, and/or firmware, that are, initially at least, not available for use. These redundant resources are available, however, to the user upon request with the understanding that authorization to use those redundant resources can result in additional cost.

The user may activate the redundant resources through manual intervention, such as through a user interface to the library. Alternatively, the redundant resources may be activated automatically when the processing load reaches a threshold or when a failure occurs. In certain embodiments of Applicants' method, use of these redundant resources is "reversible," in that authorization to use those additional resources can be removed when those additional resources are no longer needed. In other embodiments, authorization to use the redundant resources is not reversible.

Figure 1:
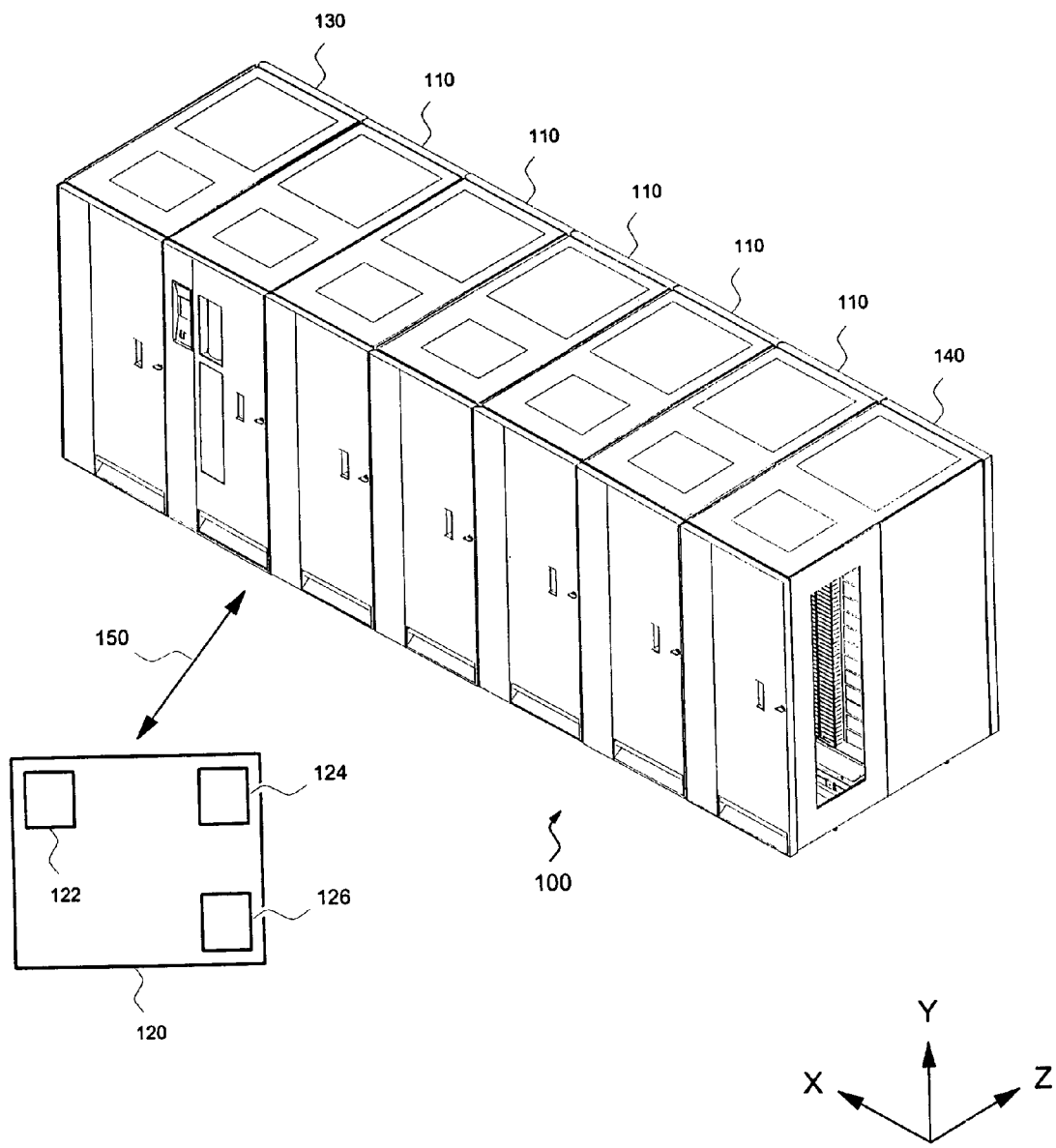
FIG. 1 is a perspective view of one embodiment of Applicants' automated data storage library.

FIG. 1 illustrates an automated data storage library 100 with left hand service bay 130, one or more storage frames 110, and right hand service bay 140. In general, a storage frame 110 comprises an expansion component of the library. Such storage frames 110 may be added or removed to expand or reduce the size and/or functionality of the automated data storage library 100. Frames may comprise storage shelves, one or more data storage drives, import/export stations, accessors, operator panels, and controllers.

In the illustrated embodiment of FIG. 1, automated data storage library 100 is interconnected with host computer 120 via communication link 150. Although FIG. 1 shows a single host computer, in other embodiments Applicants' library 100 is capable of communicating with a plurality of host computers.

Host computer 120 comprises a computer system, such as a mainframe, personal computer, workstation, and combinations thereof, including an operating system 122 such as Windows, AIX, Unix, MVS, LINUX, etc. (Windows is a registered trademark of Microsoft Corporation; AIX is a registered trademark and MVS is a trademark of IBM Corporation; and UNIX is a registered trademark in the United States and other countries licensed exclusively through The Open Group.) In certain embodiments, host computer 120 includes a storage management program 124. The storage management program 124 in the host computer 120 may include the functionality of storage management type programs known in the art that manage the transfer of data to a data storage and retrieval system, such as the IBM DFSMS implemented in the IBM MVS operating system.

Storage management program 124 may include known storage management program functions, such as recall and migration. The storage management program 124 may be implemented within the operating system 122 of the host computer 120 or as a separate, installed application program 126. Alternatively, storage management program 124 may include device drivers, backup software, application programs 126, and the like.

In certain embodiments, communication link 150 is selected from the group consisting of a serial interconnection, such as RS-232 or RS-422, an Ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, or other interconnections and/or protocols as is known to those of skill in the art.

Figure 2:
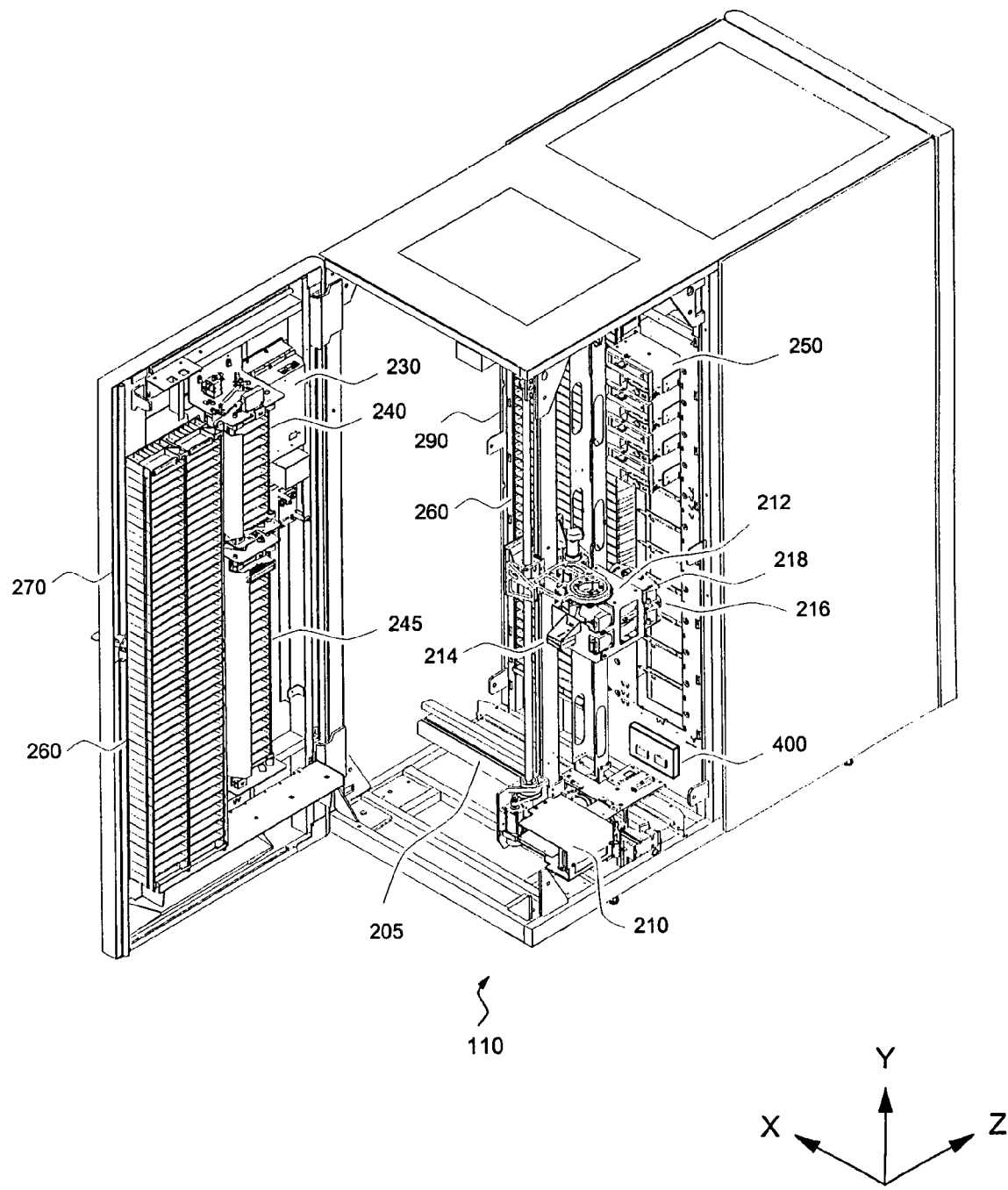
FIG. 2 is a perspective view of the minimum configuration of Applicants' automated data storage library.

FIG. 2 shows one embodiment of storage frame 110. Frame 110 is arranged for accessing portable data storage media in response to commands from one or more host systems, such as host computer 120 (FIG. 1). Frame 110 includes a plurality of storage shelves 260, on front wall 270 and rear wall 290, for storing portable data storage cartridges that contain data storage media. Frame 110 may include one or more data storage drives 250 for reading and/or writing data with respect to the data storage media, and may include accessor 210 for transporting the data storage media between the plurality of storage shelves 260 and the data storage drive(s) 250. The storage frame 110 may optionally comprise an operator panel 230 or other user interface, such as a web-based interface, which allows a user to interact with the library. Storage frame 110 may optionally comprise an upper import/export station 240 and/or a lower import/export station 245, which allows data storage media to be inserted into the library and/or removed from the library without disrupting library operation.

Accessor 210 comprises lifting servo section 212 which is capable of bi-directional movement along the vertical Y axis. Accessor 210 further comprises at least one gripper assembly 216 for gripping one or more data storage media. In the illustrated embodiment of FIG. 2, accessor 210 further includes a bar code scanner 214 or other reading system, such as a smart card reader or similar system, to "read" identifying information about the data storage media. In the illustrated embodiment of FIG. 2, accessor 210 further includes a second gripper mechanism 218 disposed on lifting servo section 212.

In certain embodiments, library 100 includes a controller, such as controller 400 disposed in the illustrated frame 10 of FIG. 2. In other embodiments, Applicants' library 100 includes a distributed control system comprising a plurality of processor nodes.

Library 100 may comprise additional storage frames 110, each having storage shelves 260 accessible by accessor 210. Accessor 210 moves bi-directionally along the horizontal X axis on rail 205. In embodiments of library 100 which comprise multiple frames, the rail 205 in each of those individual frames are aligned such that accessor 210 may travel from one end of the library to the opposite end along a contiguous rail system. For example and referring again to FIG. 1, accessor 210 is capable of bi-directional movement along the X axis from service bay 130, through the plurality of frames 110, to the service bay 140.

Figure 3:
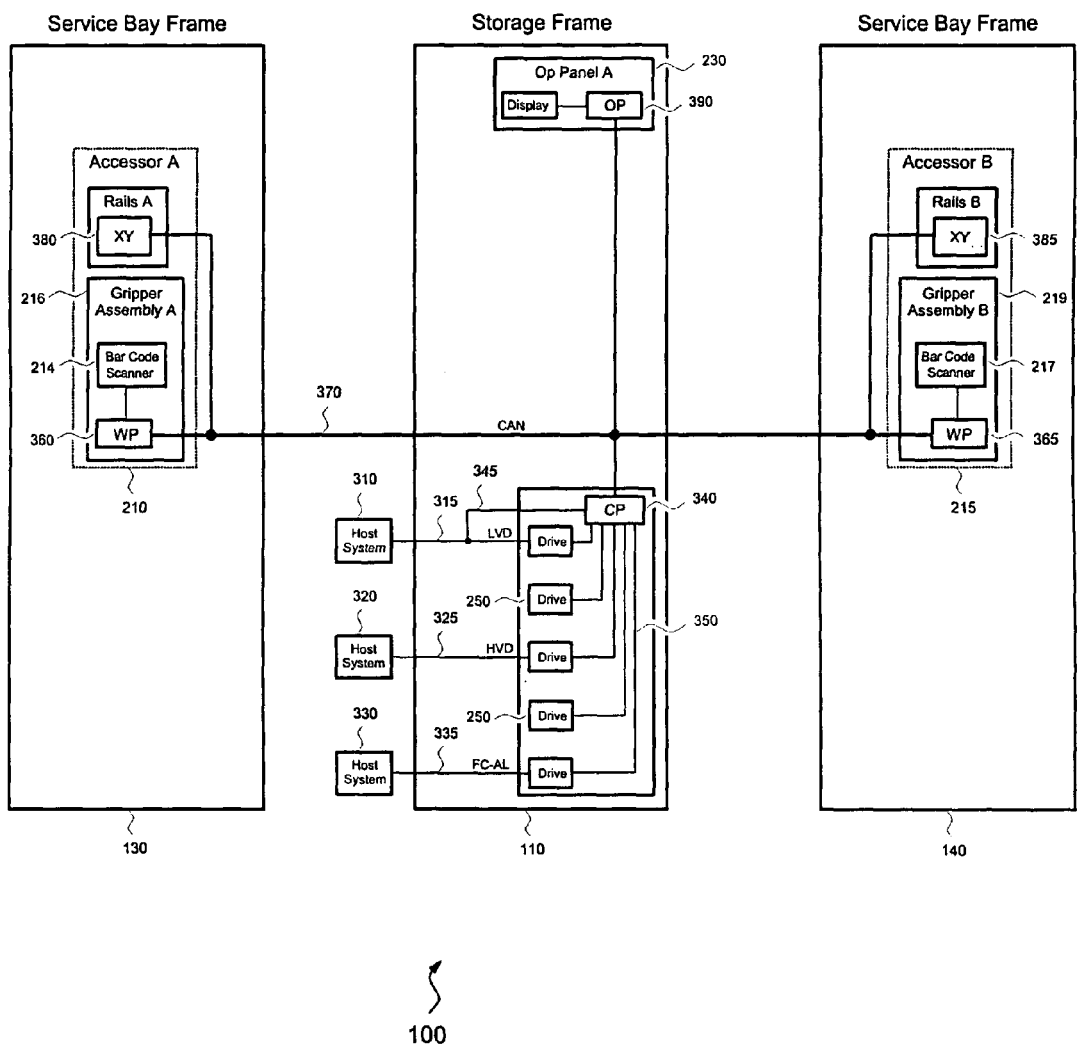
FIG. 3 is a block diagram illustrating another embodiment of Applicants' automated data storage library which employs a distributed system of modules with a plurality of processor nodes.

FIG. 3 shows a block diagram of certain components of one embodiment of Applicants' automated data storage library 100. The illustrated embodiment of FIG. 3 employs a distributed system of modules with a plurality of processor nodes. An example of such an automated data storage library comprises the IBM 3584 UltraScalable Tape Library. The library of FIG. 3 comprises one or more storage frames 110, a left hand service bay 130 and a right hand service bay 140.

The left hand service bay 130 is shown including accessor 210. As discussed above, accessor 210 comprises a gripper assembly 216 and, optionally, a reading system 214 to "read" identifying information about the data storage media. The right hand service bay 140 is shown with a second accessor 215. The second accessor 215 comprises a gripper assembly 219 and may include a reading system 217 to "read" identifying information about the data storage media. In the event of a failure or other unavailability of the accessor 210, or its gripper 216, etc., the second accessor 215 may perform some or all of the functions of the first accessor 210. The two accessors 210 and 215 may share one or more mechanical paths or they may comprise completely independent mechanical paths. In one example, the accessors 210 and 215 utilize a common horizontal rail with independent vertical rails. The first accessor 210 and the second accessor 215 are described as first and second for descriptive purposes only and this description is not meant to limit either accessor to an association with either the left hand service bay 130, or the right hand service bay 140.

First accessor 210 and second accessor 215 move their grippers in at least two directions, called the horizontal "X" direction and vertical "Y" direction, to retrieve and grip, or to deliver and release the data storage media at the storage shelves 260 and to load and unload the data storage media at the data storage drives 250.

In the illustrated embodiment of FIG. 3, library 100 receives commands from one or more host systems 310, 320, and/or 330. The host systems, such as host servers, communicate with the library via communication links 315, 325, and/or 335, respectively, to provide commands to access particular data storage media and move the media, for example, between the storage shelves 260 (FIG. 2) and the data storage drives 250 (FIGS. 2, 3). The commands are typically logical commands identifying the media and/or logical locations for accessing the media.

The illustrated embodiment of FIG. 3 comprises a distributed control system receiving the logical commands from hosts, determining the required actions, and converting the actions to physical movements of first accessor 210 and/or second accessor 215.

In certain embodiments, Applicants' distributed control system comprises a plurality of processor nodes, each having one or more processors. In certain embodiments, Applicants' distributed control system includes communication processor node 340 disposed in storage frame 110. Communication processor node 340 provides a communication link for receiving the host commands, either directly via link 315, 345 or through the drives 250, via link(s) 350.

In certain embodiments, communication processor node 340 is disposed in frame 110 adjacent to the data storage drives 250. In certain embodiments, Applicants' distributed processor system further comprises one or more work processor nodes. For example in the illustrated embodiment of FIG. 3, work processor node 360 is disposed on first accessor 210 and work processor node 365 is disposed on second accessor 215. Nodes 360 and 365 are each coupled to the communication processor node 340 via a network 370.

Each work processor node may respond to received commands that are broadcast to the work processor nodes from any communication processor node, and the work processor node may also direct the operation of, for example, first accessor 210, providing move commands. In certain embodiments, Applicants' distributed control system further includes XY processor node 380/385 disposed in accessor 210/215, respectively. The XY processor node 380 is coupled to the network 370 and positions the gripper 216.

In certain embodiments, Applicants' distributed control system further includes an operator panel processor node 390 disposed in the optional operator panel 230 (FIGS. 2, 3) for providing an interface for communicating between the operator panel and the communication processor node 340, work processor nodes 360/365, and the XY processor nodes 380/385.

Network 370 comprises a common bus coupling the various processor nodes. In certain embodiments, network 370 comprises a robust wiring network, such as the commercially available CAN (Controller Area Network) bus system, which is a multi-drop network, having a standard access protocol and wiring standards, for example, as defined by CiA, the CAN in Automation Association, Am Weich Selgarten 26, D-91058 Erlangen, Germany. Other networks, such as Ethernet, or a wireless network system, such as RF or infrared, may be employed in the library as is known to those of skill in the art. In addition, network 370 may comprise several independent networks where any single processor node may only be connected to one or more other processor nodes.

The communication processor node 340 is coupled to each of the data storage drives 250 via communication links 350, communicating with the drives and with host systems 310, 320 and 330. Alternatively, the host systems may be directly coupled to the communication processor node 340, at communication link 315, 345 for example, or to control port devices (not shown) which connect the library to the host system(s) with a library interface similar to the drive/library interface. As is known to those of skill in the art, various communication arrangements may be employed for communication with the hosts and with the data storage drives. In certain embodiments, communication links 315 and 325 are SCSI busses. Communication link 335 comprises a Fiber Channel-Arbitrated Loop which is a high speed serial data interface, allowing transmission over greater distances than the SCSI bus systems.

In certain embodiments, data storage drives 250 are disposed in close proximity to the communication processor node 340, and employ a short distance communication scheme, such as SCSI, or a serial connection, such as RS-422. The data storage drives 250 are thus individually coupled to the communication processor node 340 by means of links 350. Alternatively, they may be coupled to processor node 340 through a common bus.

Additional storage frames 110 may be provided and each is coupled to the adjacent storage frame. Any of the storage frames 110 may comprise communication processor nodes 340, storage shelves 260, data storage drives 250, and networks 370.

In FIG. 3 and the accompanying description, the first and second accessors are associated with the left hand service bay 130 and the right hand service bay 140. This is for illustrative purposes and there may not be an actual association. In certain embodiments, Applicants' library 100 does not include left hand service bay 130 and/or right hand service bay 140.

Figure 4:
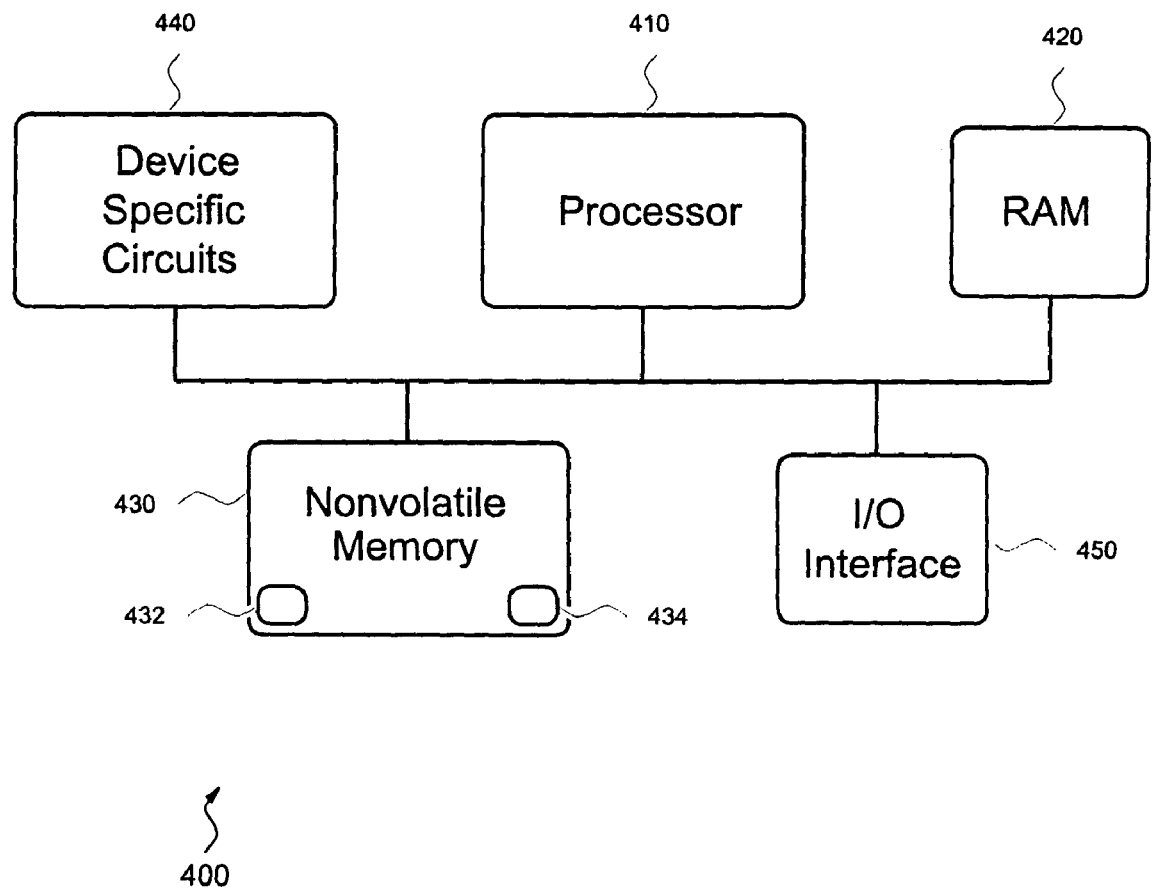
FIG. 4 is a block diagrammatic representation of a library controller.

Applicants' data storage and retrieval system includes one or more controllers to direct the operation of that system. Such one or more controllers may take many different forms and may comprise an embedded system, a distributed control system, a personal computer, workstation, etc. FIG. 4 shows one embodiment of Applicants' data storage and retrieval system controller 400. Controller 400 includes a processor 410, RAM (Random Access Memory) 420, nonvolatile memory 430, device specific circuits 440, and I/O interface 450. Alternatively, the RAM 420 and/or nonvolatile memory 430 may be contained in the processor 410 as could the device specific circuits 440 and I/O interface 450.

Processor 410 may comprise an off the shelf microprocessor, custom processor, FPGA (Field Programmable Gate Array), ASIC (Application Specific Integrated Circuit), discrete logic, etc. The RAM (Random Access Memory) 420 is typically used to hold variable data, stack data, executable instructions, etc. The nonvolatile memory 430 may comprise any type of nonvolatile memory such as EEPROM (Electrically Erasable Programmable Read Only Memory), flash PROM (Programmable Read Only Memory), battery backup RAM, hard disk drive, etc.

The device specific circuits 440 provide additional hardware to enable the controller 400 to perform unique functions. The device specific circuits 440 may comprise, for example, electronics that operate the one or more accessors moveably disposed in the data storage and retrieval system.

The nonvolatile memory 430 is typically used to hold executable firmware 432 and any nonvolatile data. The I/O interface 450 is a communication interface that allows the processor 400 to communicate with devices external to the controller. Examples may comprise serial interfaces such as RS-232 or USB (Universal Serial Bus), SCSI (Small Computer Systems Interface), Fibre Channel, etc.

Applicants' invention includes a method to provide selectable redundant accessor availability in an automated data storage library, such as library 100. Applicants' library includes a first accessor. In certain embodiments, the first accessor comprises two or more grippers, such as grippers 216 and 218 (FIG. 2). In certain embodiments, library 100 comprises two or more accessors, such as accessors 210 and 215 (FIGS. 2 and 3). In certain embodiments, the user purchases an automated data storage library and either at that time, or at a later time, the user obtains a second gripper. Obtaining and/or operating that second gripper may require proffering a full or partial payment for a second gripper. Such a payment may be necessary to recoup some or all of the manufacturing costs for the redundant resources, including hardware, software, and/or firmware, as there is no guarantee that the user will ever use the redundant accessor capabilities of the library. Without such second gripper hardware, software, and/or firmware, certain levels of redundant accessor support may not be possible.

In certain embodiments, the user purchases an automated data storage library and either at that time, or at a later time, obtains a second accessor. Obtaining and/or operating that second accessor may require proffering a full or partial payment for the second accessor. Such a payment may be necessary to recoup some or all of the manufacturing costs for the redundant resources, including hardware, software, and/or firmware, as there is no guarantee that the user will ever use the redundant accessor capabilities of the library. Without such second accessor hardware, software, and/or firmware, certain levels of redundant accessor support for accessor availability may not be possible. Herein, redundant accessor support, redundant accessor availability, and redundant accessor capability, refer to support for redundant accessors and/or redundant grippers.

In certain embodiments, Applicants' method includes up to five levels of accessor availability. In the first level, only a single accessor and a single gripper are supported. If present, a second accessor and/or a second gripper will not be used at any time. The second level of redundant accessor support provides the capability to use a second gripper. In one embodiment, a second gripper is used to take over when the first gripper fails. In another embodiment, the second gripper is used to improve the performance of the library. This is possible because the first and second gripper may be used to perform two cartridge move operations with a single command rather than the usual two commands with a single gripper. For example, the second gripper may be used to support the SCSI exchange medium command which can move a cartridge from a drive and move another cartridge into the drive with a reduction of accessor motion.

The third level of redundant accessor support provides cold-standby capability. By "cold-standby capability," Applicants mean that the second accessor may be placed into operation, but operation of that second accessor may require a manual switchover between the first and second accessors. Therefore using this third level of redundant accessor support, a failure of the first accessor is potentially disruptive to the host computer(s). Data processing operations involving the host may have to be restarted after the accessor switchover has occurred.

The fourth level of redundant accessor support provides hot-standby capability. By "hot-standby capability," Applicants mean providing a non-disruptive switchover when switching between the two accessors, such as when an accessor fails.

The fifth level of redundant accessor support provides dual-active accessor support. By "dual-active accessor support," Applicants mean simultaneous operation of both accessors to work in a cooperative manner to improve the overall performance of the automated data storage library. Dual-active mode may also provide the same non-disruptive protection that hot-standby mode offers for an accessor failure. Alternatively, hot-standby mode and dual active mode may be complementary, and either or both may be selectable upon request.

In certain embodiments of Applicants' method, a payment for each level of redundant accessor support is required. In other embodiments, Applicants' method may provide combinations of levels of redundant accessor support for a single payment.

Figure 5:
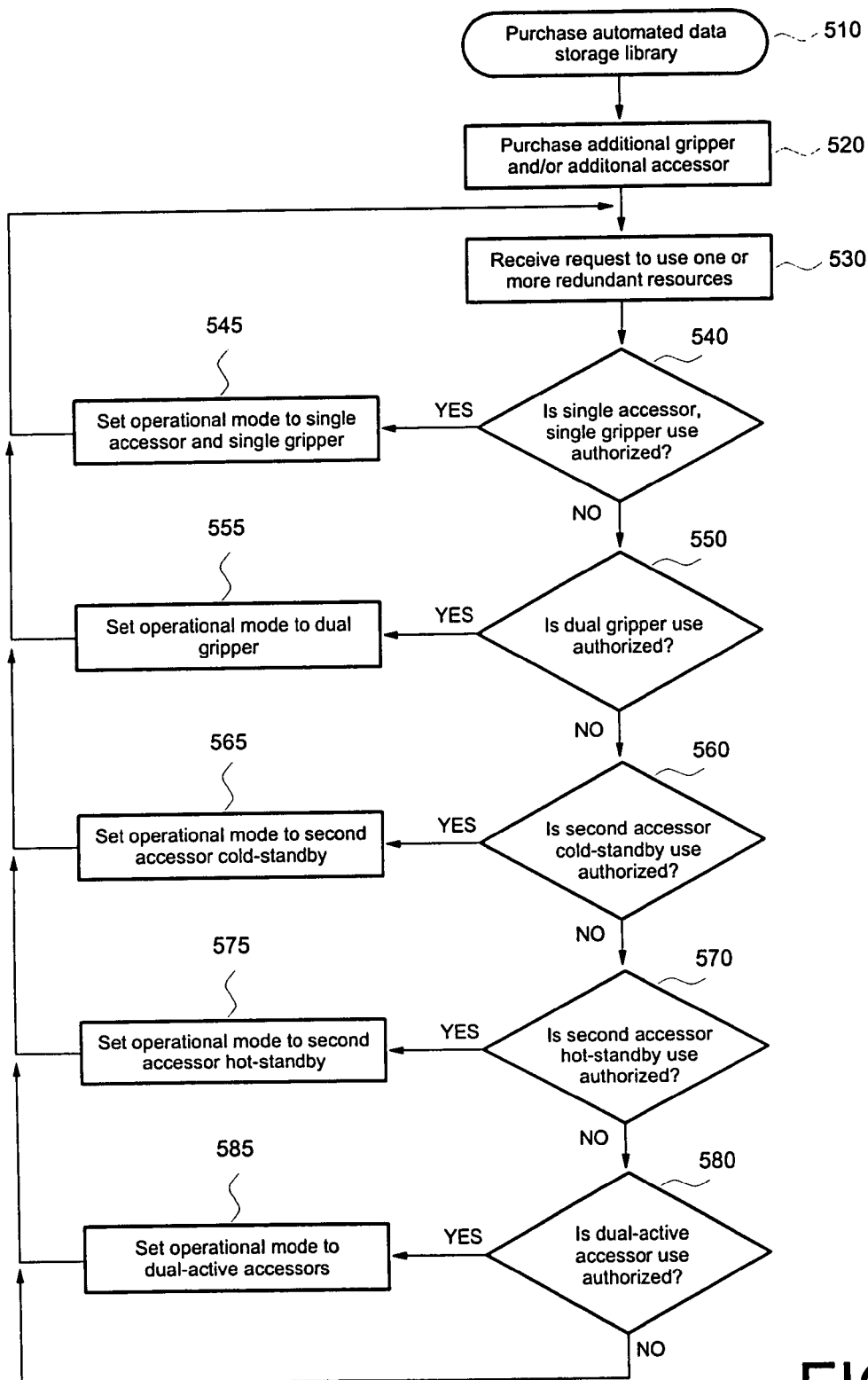
FIG. 5 is a flow chart summarizing the steps of Applicants' method.

FIG. 5 summarizes the steps of Applicants' method. Referring now to FIG. 5, in step 510 a user at a first time purchases Applicants' data storage and retrieval system which includes one or more data storage devices, such as data storage drive 250 (FIGS. 2, 3), a robotic accessor, such as accessor 210, a cartridge gripper, such as gripper 216, and necessary software and/or firmware to operate the first accessor and the first gripper. In certain embodiments, step 510 further includes obtaining software and/or firmware to operate a second gripper and/or a second accessor.

At a second time, in step 520, a user purchases a second gripper and/or a second accessor. In certain embodiments, the second time of step 520 is subsequent to the first time of step 510. Alternatively, the second time of step 520 is the same as the first time of step 510, i.e. step 510 and step 520 may be combined into a single step where the user purchases a second gripper and/or a second accessor at the time of the library purchase, where the second gripper and/or second accessor are not, initially at least, operable. In certain embodiments, step 520 further includes obtaining software and/or firmware to operate the second gripper and/or the second accessor.

At a third time, the library may receive authorization to activate and use the second gripper and/or second accessor.

As those skilled in the art will appreciate, if the first time, second time, and third time, are the same, then the system purchase comprises a prior art transaction. If the third time differs from the second time, however, then the user is obtaining use of the previously provided redundant accessor capability, including hardware, software, and/or firmware, upon request.

In step 530, automated data storage library 100 receives a redundant accessor request. This request may comprise a request to enable additional accessor availability, or the request may comprise a request to use an additional accessor or gripper. In certain embodiments, step 530 includes checking for a redundant accessor request by the library controller. In certain embodiments, such a request is made by an operator using a library user interface such as operator panel 230 (FIG. 2), a web user interface, etc. In other embodiments, the request comprises a command or request from a host computer such as host computer 120, 310, 320, 330 (FIGS. 1 and 3). In certain embodiments, the request may comprise a request by the library, for example after an accessor failure the library may request redundant accessor support. In yet other embodiments, the request comprises a command or request from some other interface of the data storage and retrieval system.

In response to a redundant accessor request, Applicants' method determines whether the additional accessor capability requested is authorized. In certain embodiments, the redundant accessor request may be based on the "honor system" where the customer is expected to notify the supplier that the system has been upgraded. In this case, the additional accessor capability may be authorized once it is requested. In other embodiments, the automated data storage library may require an upgrade software key where the customer is required to enter a proper upgrade key to enable the redundant accessor feature. In this case, the additional accessor capability may be authorized when a proper key is supplied to the library.

Such an upgrade key may be obtained from a phone call to an ordering system, through a fax request, through a web site, remote computer, sales office, etc. In certain embodiments, the automated data storage library reports that the upgrade has been made. In this embodiment, the automated data storage library may have a reporting mechanism where the library can notify the supplier or manufacturer that the system has been upgraded, or the reporting mechanism can be used to authorize an upgrade. For example, a mechanism for reporting equipment failures is commonly referred to as call-home support. This mechanism may also be used to track or authorize system upgrades. In this case, the additional accessor capability may be authorized when the upgrade is reported.

In step 540, Applicants' method determines if a first level of redundant accessor support was requested in step 530 and if that first level of support is authorized. By "first level of redundant accessor support," Applicants mean that no support for the second accessor and no support for the second gripper is authorized. This first level allows the automated data storage library to "back out" any previous redundant accessor support that may have been requested and/or authorized. This first level also provides a method to give back resources that may have been allocated on an as-needed basis.

If Applicants' method determines in step 540 that the first level of redundant accessor support is requested and authorized, then the method moves to step 545 where the library firmware only provides support for a single accessor and a single gripper. Step 545 may comprise setting an indication that only a single accessor and single gripper should be supported. Alternatively, step 545 may comprise a firmware update of all or part of the operational firmware of the automated data storage library. After executing step 545, Applicants' method moves to step 530 where the library controller checks for another redundant accessor request.

If on the other hand Applicants' method determines in step 540 that the first level of redundant accessor support is not selected and/or authorized, then the method moves to step 550 where the method determines if a second level of redundant accessor support is requested and authorized. The second level of redundant accessor support comprises enabling use of a second gripper.

For example, the first gripper may fail and it may become necessary to use the second gripper in its place. The use of the second gripper does not necessarily require a failure of the first gripper. If Applicants' method determines in step 550 that the second level of redundant accessor support is requested and authorized, then Applicants' method moves to step 555 where the library firmware provides support for two grippers. Step 555 may comprise setting an indication that two grippers should be supported. Alternatively, step 555 may comprise a firmware update of all or part of the operational firmware of the automated data storage library. After executing step 555, Applicants' method moves to step 530 and continues.

If on the other hand Applicants' method determines in step 550 that the second level of redundant accessor support is not requested and/or authorized, then the method moves to step 560 where the method determines if a third level of redundant accessor support is requested and authorized. The third level of redundant accessor support comprises enabling cold-standby availability of the second accessor. For example, the first accessor may fail and it may become necessary to use the second accessor in its place.

Use of this level of redundant accessor support, i.e. manually switching from using the first accessor to using the second accessor, may be disruptive to the host computer. For example, there may be a time interval after the failure of the first accessor and before the second accessor is operable.

If Applicants' method determines in step 560 that the third level of redundant accessor support is requested and authorized, then the method moves to step 565 where the library firmware provides support for dual accessors in a cold standby mode. Step 565 may comprise setting an indication that cold-standby mode should be supported. Alternatively, step 565 may comprise a firmware update of all or part of the operational firmware of the automated data storage library. After executing step 565, Applicants' method moves to step 530 and continues.

If on the other hand, Applicants' method determines in step 560 that the third level of redundant accessor support is not requested and/or authorized, then the method moves to step 570 where the method determines if a fourth level of redundant accessor support is requested and/or authorized. If Applicants' method determines in step 570 that the fourth level of redundant accessor support is requested and authorized, then the method moves to step 575 where the library firmware provides support for dual accessors in a hot-standby mode.

Step 575 may comprise setting an indication that hot-standby mode should be supported. Alternatively, step 575 may comprise a firmware update of all or part of the operational firmware of the automated data storage library. In certain embodiments, the indication set by step 575 results in monitoring the operational status of the first accessor, and if a failure of that first accessor is detected, immediately enabling operation of the second accessor. After executing step 575, Applicants' method moves to step 530 where the library controller checks for another redundant accessor request.

If on the other hand, Applicants' method determines in step 570 that the fourth level of redundant accessor support is not requested and/or authorized, then the method moves to step 580 where the method determines if a fifth level of redundant accessor support has been requested and/or authorized. The fifth level of redundant accessor support comprises dual-active accessor support.

If Applicants' method determines in step 580 that the fifth level of redundant accessor support is requested and authorized, then the method moves to step 585 where the library firmware provides support for dual-active accessors. Step 585 may comprise setting an indication that dual-active mode should be supported. Alternatively, step 585 may comprise a firmware update of all or part of the operational firmware of the automated data storage library. After executing step 585, control moves to step 530 where the library controller checks for another redundant accessor request.

If on the other hand, Applicants' method determines in step 580 that the fifth level of redundant accessor support has not been requested and/or authorized, then the method moves to step 530 and continues.

The embodiments of Applicants' method recited in steps 550 and 555 of FIG. 5 refer to support for dual grippers. There may be more than two grippers with varying levels of support for the multiple grippers. For example, two grippers may be provided in the base product with additional grippers available upon request.

The embodiments of Applicants' method recited in FIG. 5 refer to support for dual accessors. In other embodiments, Applicants' method may support more than two accessors with varying levels of availability for those multiple accessors.

The embodiments of Applicants' method recited in FIG. 5. may be implemented separately. Moreover, in certain embodiments, individual steps recited in FIG. 5 may be combined, eliminated, or reordered. For example, steps 540 and 545 may be eliminated if "back out" support is not a desired option. In another example, there my be separate steps for backing out redundant accessor support and redundant gripper support. Still further, steps 550 and 555 may be eliminated if it is desired to not support multiple grippers. Additional steps may be added if it is desired to enable additional grippers on additional accessors.

The embodiments of Applicants' method described above refer to a first, second, third, fourth and fifth level of redundant accessor support. In certain embodiments, more than one level, i.e. redundant accessor capabilities, may be selected at the same time. These levels are given for descriptive purposes only, and should not be taken to limit the invention to certain levels, combinations of levels or even a certain number of levels providing redundant accessor support.

In certain embodiments, Applicants' invention includes instructions residing in non-volatile memory 430, where those instructions are executed by processor 410 to performs steps 530 through 585 recited in FIG. 5. In other embodiments, Applicants' invention includes instructions residing in any other computer program product, where those instructions are executed by a computer external to, or internal to, system 100, to perform steps 530 through 585 of FIG. 5. In either case, the instructions may be encoded in an information storage medium comprising, for example, a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

While the preferred embodiments of the present invention have been illustrated in detail, the skilled artisan will appreciate that modifications and adaptations to those embodiments may be made without departing from the scope of the present invention as set forth in the following claims.

We claim:

1. A method to provide selectable redundant accessor availability in a data storage and retrieval system, comprising the steps of:
providing a data storage and retrieval system comprising one or more data storage devices and an accessor, wherein said accessor comprises a lifting servo section and a first gripper and a second gripper disposed on said lifting servo section;
operating said first gripper;
requesting use of said second gripper;
determining if use of said second gripper is authorized;
if use of said second gripper is authorized, operating said second gripper.

2. The method of claim 1, further comprising the following steps:
providing a software key;
providing said software key to said data storage and retrieval system to authorize the use of said second gripper.

3. A method to provide selectable redundant accessor availability in a data storage and retrieval system, comprising the steps of:
providing a data storage and retrieval system comprising one or more data storage devices, a first accessor, and a second accessor, wherein said first accessor comprises a lifting servo section and a first gripper and a second gripper disposed on said lifting servo section;
operating said first accessor but not said second accessor;
requesting use of said second accessor;
determining if use of said second accessor is authorized;
if use of said second accessor is authorized, operating said second accessor.

4. The method of claim 3, wherein said data storage and retrieval system further comprises at least one of software and firmware to operate said first accessor and said second accessor.

5. The method of claim 3, further comprising the following steps:
providing a software key;
providing said software key to said data storage and retrieval system to authorize the use of said second accessor.

6. The method of claim 3, wherein said requesting step comprises requesting use of said second accessor for cold-standby availability, and wherein said determining step comprises determining if use of said second accessor is authorized for cold-standby availability, and wherein said operating step comprises operating said second accessor for cold-standby availability if use of said second accessor is authorized for cold-standby availability.

7. The method of claim 6, further comprising the following steps:
providing a software key;
providing said software key to said data storage and retrieval system to authorize the use of said second accessor for cold-standby availability.

8. The method of claim 3, wherein said requesting step comprises requesting use of said second accessor for hot-standby availability, and wherein said determining step comprises determining if use of said second accessor is authorized for hot-standby availability, and wherein said operating step comprises operating said second accessor for hot-standby availability if use of said second accessor is authorized for hot-standby availability.

9. The method of claim 8, further comprising the steps of:
monitoring the operation of said first accessor;
if a failure of said first accessor is detected, operating said second accessor.

10. The method of claim 8, further comprising the following steps:
providing a software key;
providing said software key to said data storage and retrieval system to authorize the use of said second accessor for hot-standby availability.

11. The method of claim 3, wherein said requesting step comprises requesting use of said second accessor for dual-active accessor availability, and wherein said determining step comprises determining if use of said second accessor is authorized for dual-active accessor availability, and wherein said operating step comprises operating said second accessor and said first accessor simultaneously if use of said second accessor is authorized for dual-active accessor availability.

12. The method of claim 11, further comprising the following steps:
providing a software key;
providing said software key to said data storage and retrieval system to authorize the use of said second accessor and said first accessor simultaneously.

13. An article of manufacture comprising one or more data storage devices and an accessor comprising a lifting servo section and a first gripper and a second gripper disposed on said lifting servo section, and a computer readable medium having computer readable program code disposed therein to provide selectable redundant accessor availability, the computer readable program code comprising a series of computer readable program steps to effect:
operating said first gripper;
receiving a request to use said second gripper;
determining if use of said second gripper is authorized;
if use of said second gripper is authorized, operating said second gripper.

14. The article of manufacture of claim 13, said computer readable program code further comprising a series of computer readable program steps to effect receiving a software key authorizing use of said second gripper.

15. An article of manufacture comprising one or more data storage devices, a first accessor, a second accessor, wherein said first accessor comprises a lifting servo section and a first gripper and a second gripper disposed on said lifting servo section and a computer readable medium having computer readable program code disposed therein to provide selectable redundant accessor availability, the computer readable program code comprising a series of computer readable program steps to effect:
operating said first accessor but not said second accessor;
receiving a request to use said second accessor;
determining if use of said second accessor is authorized;
if use of said second accessor is authorized, operating said second accessor.

16. The article of manufacture of claim 15 further comprising at least one of software and firmware to operate said first accessor and said second accessor.

17. The article of manufacture of claim 15, said computer readable program code further comprising a series of computer readable program steps to effect receiving a software key to authorize use of said second accessor.

18. The article of manufacture of claim 15, wherein said computer readable program code to receive a request to use said second accessor comprises a series of computer readable program steps to receive a request for cold-standby availability for said second accessor, and wherein said computer readable program code to determine if use of said second accessor is authorized comprises a series of computer readable program steps to determine if use of said second accessor is authorized for cold-standby availability, and wherein said computer readable program code to operate said second accessor comprises a series of computer readable program steps to operate said second accessor for cold-standby availability if use of said second accessor is authorized for cold-standby availability.

19. The article of manufacture of claim 18, said computer readable program code further comprising a series of computer readable program steps to effect receiving a software key to authorize use of said second accessor for cold-standby availability.

20. The article of manufacture of claim 15, wherein said computer readable program code to receive a request to use said second accessor comprises a series of computer readable program steps to receive a request for hot-standby availability for said second accessor, and wherein said computer readable program code to determine if use of said second accessor is authorized comprises a series of computer readable program steps to determine if use of said second accessor is authorized for hot-standby availability, and wherein said computer readable program code to operate said second accessor comprises a series of computer readable program steps to operate said second accessor for hot-standby availability if use of said second accessor is authorized for hot-standby availability.

21. The article of manufacture of claim 20, said computer readable program code further comprising a series of computer readable program steps to effect:
monitoring the operation of said first accessor;
if a failure of said first accessor is detected, operating said second accessor.

22. The article of manufacture of claim 20, said computer readable program code further comprising a series of computer readable program steps to effect receiving a software key authorizing use of said second accessor for hot-standby availability.

23. The article of manufacture of claim 15, wherein said computer readable program code to receive a request to use said second accessor comprises a series of computer readable program steps to receive a request for dual-active accessor availability, and wherein said computer readable program code to determine if use of said second accessor is authorized comprises a series of computer readable program steps to determine if dual-active accessor availability is authorized, and wherein said computer readable program code to operate said second accessor comprises a series of computer readable program steps to simultaneously operate said first accessor and said second accessor if dual-active accessor availability is authorized.

24. The article of manufacture of claim 23, said computer readable program code further comprising a series of computer readable program steps to effect receiving a software key authorizing dual-active accessor availability.

25. A computer program product embodied in an information storage medium, said computer program product being usable with a programmable computer processor to provide selectable redundant accessor availability in a data storage and retrieval system comprising one or more data storage devices and an accessor, wherein said accessor comprises a lifting servo section and a first gripper and a second gripper disposed on said lifting servo section, comprising:
computer readable program code which causes said programmable computer processor to operate said first gripper;
computer readable program code which causes said programmable computer processor to receive a request to use said second gripper;
computer readable program code which causes said programmable computer processor to determine if use of said second gripper is authorized;
computer readable program code which, if use of said second gripper is authorized, causes said programmable computer processor to operate said second gripper.

26. The computer program product of claim 25, further comprising computer readable program code which causes said programmable computer processor to receive a software key authorizing use of said first gripper and said second gripper.

27. A computer program product embodied in an information storage medium, said computer program product being usable with a programmable computer processor to provide selectable redundant accessor availability in a data storage and retrieval system comprising one or more data storage devices, a first accessor, and a second accessor, wherein said first accessor comprises a lifting servo section and a first gripper and a second gripper disposed on said lifting servo section, comprising:
computer readable program code which causes said programmable computer processor to operate said first accessor but not said second accessor;
computer readable program code which causes said programmable computer processor to receive a request to use said second accessor;
computer readable program code which causes said programmable computer processor to determine if use of said second accessor is authorized;
computer readable program code which, if use of said second accessor is authorized, causes said programmable computer processor to operate said second accessor.

28. The computer program product of claim 27, wherein said data storage and retrieval system further comprises at least one of software and firmware to operate said first accessor and said second accessor.

29. The computer program product of claim 27, further comprising computer readable program code which causes said programmable computer processor to receive a software key authorizing use of said second accessor.

30. The computer program product of claim 27, wherein said computer readable program code to receive a request to use said second accessor comprises computer readable program code which causes said programmable computer processor to receive a request for cold-standby availability for said second accessor, and wherein said computer readable program code to determine if use of said second accessor is authorized comprises computer readable program code which causes said programmable computer processor to determine if cold-standby availability for said second accessor is authorized, and wherein said computer readable program code to operate said second accessor comprises computer readable program code which, if cold-standby availability for said second accessor is authorized, causes said programmable computer processor to operate said second accessor for cold-standby availability.

31. The computer program product of claim 30, further comprising computer readable program code which causes said programmable computer processor to receive a software key authorizing use of said second accessor for cold-standby availability.

32. The computer program product of claim 27, wherein said computer readable program code to receive a request to use said second accessor comprises computer readable program code which causes said programmable computer processor to receive a request for hot-standby availability for said second accessor, and wherein said computer readable program code to determine if use of said second accessor is authorized comprises computer readable program code which causes said programmable computer processor to determine if hot-standby availability for said second accessor is authorized, and wherein said computer readable program code to operate said second accessor comprises computer readable program code which, if hot-standby availability for said second accessor is authorized, causes said programmable computer processor to operate said second accessor for hot-standby availability.

33. The computer program product of claim 32, further comprising:
 computer readable program code which, if hot-standby availability for said second accessor is authorized, causes said programmable computer processor to monitor the operation of said first accessor;
 computer readable program code which, if a failure of said first accessor is detected, causes said programmable computer processor to operate said second accessor.

34. The computer program product of claim 32, further comprising computer readable program code which causes said programmable computer processor to receive a software key authorizing use of said second accessor for hot-standby availability.

35. The computer program product of claim 27, wherein said computer readable program code to receive a request to use said second accessor comprises computer readable program code which causes said programmable computer processor to receive a request for dual-active accessor availability, and wherein said computer readable program code to determine if use of said second accessor is authorized comprises computer readable program code which causes said programmable computer processor to determine if dual-active accessor availability is authorized, and wherein said computer readable program code to operate said second accessor comprises computer readable program code which, if dual-active accessor availability is authorized, causes said programmable computer processor to simultaneously operate said first accessor and said second accessor.

36. The computer program product of claim 35, further comprising computer readable program code which causes said programmable computer processor to receive a software key authorizing simultaneous operation of said first accessor and said second accessor.

\* \* \* \* \*